(12) United States Patent
Liu et al.

(10) Patent No.: US 8,362,413 B2
(45) Date of Patent: Jan. 29, 2013

(54) CONTACT DETECTION DEVICE

(75) Inventors: Man-Tian Liu, Shenzhen (CN); Jin-Wei Xiao, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 311 days.

(21) Appl. No.: 12/947,845

(22) Filed: Nov. 17, 2010

(65) Prior Publication Data

US 2012/0062904 A1    Mar. 15, 2012

(30) Foreign Application Priority Data

Sep. 9, 2010    (CN) .......................... 2010 1 0277295

(51) Int. Cl.
*G01B 11/14*    (2006.01)
(52) U.S. Cl. .......... 250/227.22; 250/227.14; 250/227.21
(58) Field of Classification Search ............. 250/227.14, 250/227.21, 227.12; 356/614–624
See application file for complete search history.

(56) References Cited

U.S. PATENT DOCUMENTS

| 3,439,179 A * | 4/1969 | Shlesinger, Jr. .......... 250/227.22 |
| 5,677,688 A * | 10/1997 | O'Mara et al. .................. 341/31 |
| 8,124,926 B2 * | 2/2012 | Ishida ...................... 250/227.14 |

\* cited by examiner

*Primary Examiner* — Tony Ko
(74) *Attorney, Agent, or Firm* — Altis Law Group, Inc.

(57) ABSTRACT

A contact detection device includes a number of first bars and second bars. Each first bar includes a number of first sheets. Each second bar includes a number of second sheets. The first bars and the second bars intersect to form a grid with a number of nodes as a contact detection area, each node having exclusive coordinates. Each first sheet defines a light hole, and the light holes are arranged in the same column line in the grid. Opposite sides of each first sheet arranges one photosensitive member above the corresponding light hole, and position of each photosensitive member is determined according to the coordinates of the nearest node in a predetermined direction. Opposite ends of each two adjacent second bars respectively arrange one light emitter therebetween. When one point of the grid is pressed, the light emitted by the light emitter irradiates the photosensitive member.

5 Claims, 3 Drawing Sheets

CONTACT DETECTION DEVICE

BACKGROUND

1. Technical Field

The present disclosure relates to device input technologies; and particularly to a multiple contact detection device.

2. Description of Related Art

Touch input devices are commonly capable of determining one contact point. When more than one contact point is simultaneously applied, the points registered by the touch input device are often inaccurate.

Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout five views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
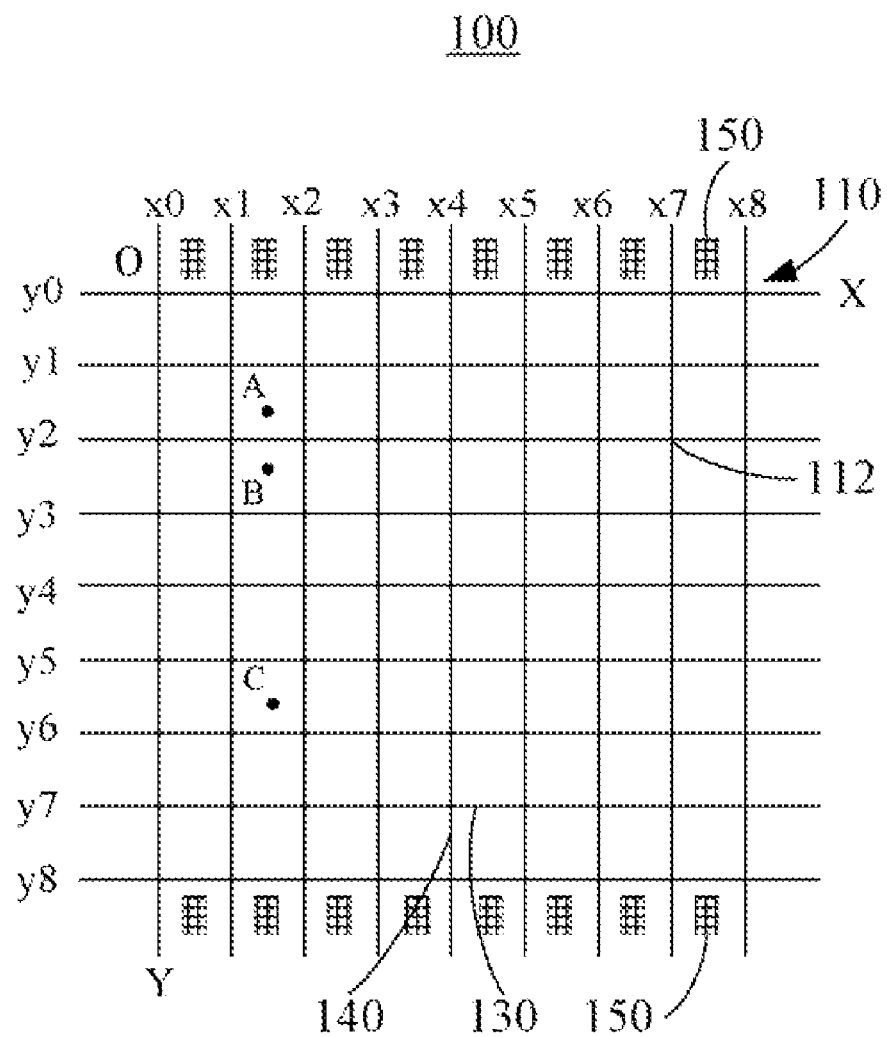
FIG. 1 is a schematic view of a contact detection device in accordance with an exemplary embodiment. The contact detection device includes a number of first bars and a number of second bars.
Figure 2:
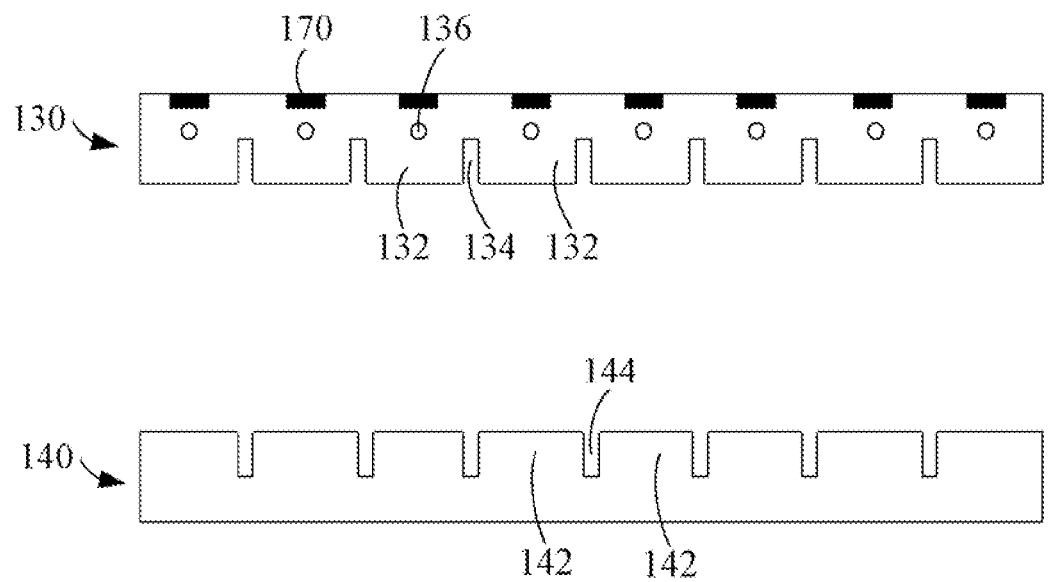
FIG. 2 is a schematic view of the first bar and the second bar of FIG. 1.

Referring to FIGS. 1 and 2, a contact detection device includes a number of first bars 130, a number of second bars 140, and a number of light emitters 150. The first bars 130 are aligned and separated from each other by a first uniform distance. The second bars 140 are also aligned and separated from each other by a second uniform distance. Height of the first bars 130 is substantially equal to that of the second bars 140, and the first distance is substantially equal to the second distance.

The first bars 130 and the second bars 140 intersect to form a grid 110 with a number of nodes 112 as contact detection areas. A rectangular coordinate system is defined on the grid 110. Origin O of the coordinate system is defined at one end of the grid 110. X-axis and Y-axis of the coordinate system extend along two edges connected to the origin O respectively. As such, each node 112 of the grid 110 has exclusive coordinates.

Each first bar 130 includes a number of rectangular first sheets 132 arranged horizontally. Lower ends of each two adjacent first sheets 132 define a first slot 134 at the junction thereof, thus width of the lower end of the first sheet 132 is substantially equal to the second distance. Each first sheet 132 defines a light hole 136, and locations of the light holes 136 on the first sheets 132 are the same such that the light holes 136 are arranged in the same column line in the grid 110.

The contact detection device 100 further includes a number of photosensitive members 170. On opposite sides of each first sheet 132, two photosensitive members 170 are respectively arranged, and each photosensitive member 170 is located above the corresponding light hole 136. Position of each photosensitive member 170 can be determined according to the coordinates of the nearest node 112 in a predetermined direction, such as the coordinates of the nearest node 112 on the left. As a result, each photosensitive member 170 has an exclusive position.

Opposite ends of each two adjacent second bars 140 respectively arrange one light emitter 150 therebetween. Each second bar 140 includes a number of rectangular second sheets 142 arranged horizontally. Upper ends of each two adjacent second sheets 142 define a second slot 144 at the junction thereof, thus width of the upper end of the second sheet 142 is substantially equal to the first distance. Sum of heights of one second slot 144 and one first slot 134 is substantially equal to the height of the first bar 130. The second slots 144 cooperates with the first slots 134 such that the first bars 130 and the second bars 140 can intersect.

Figure 3:
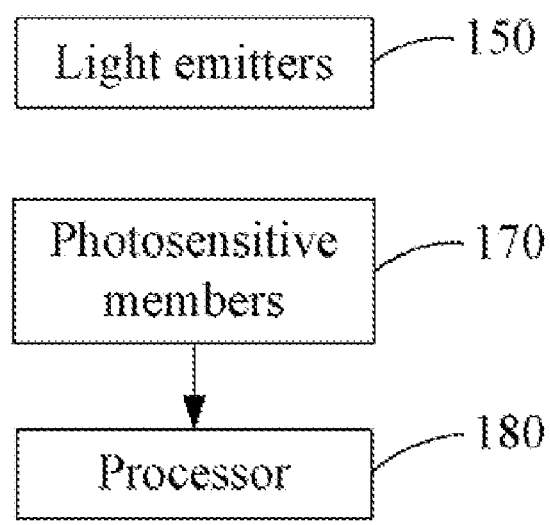
FIG. 3 is a block diagram of the contact detection device of FIG. 1 in accordance with an exemplary embodiment.

Referring also to FIG. 3, the contact detection device 100 further includes a processor 180. When the grid 110 is not pressed, the light holes 136 are arranged in the same column line, thus light emitted by the light emitter 150 will pass through the light holes 136, and not be incident on the photosensitive members 170 located above the light holes 136.

When one point of the grid 110 is pressed, the light hole 136 of the pressed first sheet 132 moves downward, thus light emitted by the light emitter 150 cannot pass through the light hole 136 of the pressed first sheet 132, and irradiates the photosensitive member 170 on the pressed first sheet 132. As such, the photosensitive member 170 on the pressed first sheet 132 generates a detection signal, and transmits the detection signal to the processor 180. The processor 180 determines position of the contact point according to the position of the photosensitive member 170 on the pressed first sheet 132.

Unless more than two contact points, such as three points A, B, C, (see FIG. 1), located between the same two adjacent second bar 140 (or column) are simultaneously pressed, multiple photosensitive members 170 on the pressed first sheets 132 can all receive the light emitted by the corresponding light emitters 150, generate the detection signals, and transmit the detection signals to the processor 180. Therefore, the processor 180 can determine positions of the more than two contact points, thus multiple contact can be accurately detected.

Because the opposite ends of each two adjacent second bars 140 respectively arrange one light emitter 150 therebetween, and the opposite sides of the first sheet 132 respectively arrange one photosensitive member 170, even if two points A, B located between the same two adjacent second bar 140 are simultaneously pressed, the photosensitive members 170 on the two pressed first sheets 132 can respectively receive the light transmitted by the two light emitters 150 located between the opposite ends of the two adjacent second bars 140. Therefore, the processor 180 accurately detects positions of the two contact points A, B in the same column.

It is to be understood, even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. A contact detection device, comprising:

a number of light emitters;

a number of photosensitive members;

a number of first bars parallel with each other, each first bar comprising a number of first sheets arranged horizontally, and lower ends of each two adjacent first sheets defining a first slot at the junction thereof, each first sheet defining a light hole and arranging one photosensitive member above the light hole at a first side;

a number of second bars parallel with each other, each second bar comprising a number of second sheets arranged horizontally, and upper ends of each two adjacent second sheets defining a second slot at the junction thereof; the second slots cooperating with the first slots such that the first bars and the second bars intersect to form a grid with a number of nodes as a contact detection area, and each node have exclusive coordinates; first ends of each two adjacent second bars arranging one light emitter therebetween; and a processor;

wherein locations of the light holes on the first sheets are the same such that the light holes are arranged in the same column line in the grid; position of each photosensitive member is capable of being determined according to the coordinates of the nearest node in a predetermined direction, when the grid is not pressed, light emitted by the light emitter passes through the light holes; and when one point of the grid is being pressed, the light hole of the pressed first sheet moves downward, the light emitted by the light emitter cannot pass through the light hole of the pressed first sheet and irradiates the photosensitive member on the pressed first sheet; the photosensitive member on the pressed first sheet generates a detection signal, and transmits the detection signal to the processor; the processor determines positions of the pressed point according to the position of the photosensitive member on the pressed first sheet.

2. The contact detection device according to claim 1, wherein each first sheet further arranges one photosensitive member on a second side opposite to the first side, second ends opposite to the first ends of each two adjacent second bars also arrange one light emitter therebetween.

3. The contact detection device according to claim 1, wherein the first bars are separated from each other by a first uniform distance, and the second bars are separated from each other by a second uniform distance, width of the lower end of the first sheet is equal to the second distance; and width of the upper end of the second sheet is equal to the first distance.

4. The contact detection device according to claim 3, wherein the first distance is equal to the second distance.

5. The contact detection device according to claim 1, wherein height of the first bars is equal to that of the second bars, and height of one second slot and one first slot is equal to the height of the first bar.

\* \* \* \* \*